(12) United States Patent
Tanaka et al.

(10) Patent No.: US 10,770,985 B2
(45) Date of Patent: Sep. 8, 2020

(54) VEHICLE AUXILIARY POWER SUPPLY DEVICE

(71) Applicant: Mitsubishi Electric Corporation, Chiyoda-ku, Tokyo (JP)

(72) Inventors: Takeshi Tanaka, Tokyo (JP); Yukio Nakashima, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/327,258

(22) PCT Filed: Jul. 18, 2014

(86) PCT No.: PCT/JP2014/069201
§ 371 (c)(1),
(2) Date: Jan. 18, 2017

(87) PCT Pub. No.: WO2016/009556
PCT Pub. Date: Jan. 21, 2016

(65) Prior Publication Data
US 2017/0179842 A1 Jun. 22, 2017

(51) Int. Cl.
*H02M 5/458* (2006.01)
*B60L 1/00* (2006.01)
*H02M 7/48* (2007.01)

(52) U.S. Cl.
CPC ............. *H02M 5/4585* (2013.01); *B60L 1/00* (2013.01); *H02M 7/4807* (2013.01);
(Continued)

(58) Field of Classification Search
CPC .......... H02M 7/42; H02M 7/48; H02M 7/487; H02M 7/493; H02M 7/501; H02M 7/4826;
(Continued)

(56) References Cited

U.S. PATENT DOCUMENTS 5,375,050 A * 12/1994 Nakata ...................... B60L 9/22
363/136
6,137,704 A * 10/2000 Ito ......................... H02M 5/458
363/132
(Continued)

FOREIGN PATENT DOCUMENTS

CN 1707932 A 12/2005
CN 102113204 A 6/2011
(Continued)

OTHER PUBLICATIONS

International Search Report (PCT/ISA/210) dated Oct. 21, 2014, by the Japanese Patent Office as the International Searching Authority for International Application No. PCT/JP2014/069201.
(Continued)

*Primary Examiner* — Bryan R Perez
(74) *Attorney, Agent, or Firm* — Buchanan Ingersool & Rooney PC

(57) ABSTRACT

A vehicle auxiliary power supply device mounted in an electric rolling stock and that includes a converter device to convert DC power supplied from a DC power supply into desired DC power, and a three-phase inverter to convert the DC power supplied from the converter device into three-phase AC power and to supply the converted power to a load, wherein a switching element of the three-phase inverter is constituted by a semiconductor module formed of a wide bandgap semiconductor.

10 Claims, 4 Drawing Sheets

(52) U.S. Cl.
CPC ....... *B60L 2200/46* (2013.01); *B60L 2210/40* (2013.01); *B60L 2210/42* (2013.01); *Y02T 10/7241* (2013.01)

(58) Field of Classification Search
CPC ...... H02M 7/497; H02M 7/49; H02M 7/4807; H02M 2007/4803; H02M 2007/4822; B60L 1/00; B60L 2200/46; B60L 2210/40–42
USPC ..... 363/35–37, 55–56.11, 65, 71–72, 97, 98, 363/131, 132
See application file for complete search history.

(56) References Cited

U.S. PATENT DOCUMENTS

| | | | |
|---|---|---|---|
| 6,388,904 B2* | 5/2002 | Nomura | H02M 3/33569 363/132 |
| 8,619,448 B2 | 12/2013 | Ogawa et al. | |
| 9,129,885 B2 | 9/2015 | Nakayama et al. | |
| 9,129,932 B2 | 9/2015 | Hayashi et al. | |
| 9,147,666 B2 | 9/2015 | Yoshihara et al. | |
| 9,299,628 B2 | 3/2016 | Miki et al. | |
| 2005/0284673 A1 | 12/2005 | Nakazawa et al. | |
| 2009/0322148 A1* | 12/2009 | Kitanaka | B60L 9/22 307/9.1 |
| 2010/0327837 A1 | 12/2010 | Tsugawa et al. | |
| 2011/0101906 A1 | 5/2011 | Tagome | |
| 2013/0063067 A1* | 3/2013 | Tanaka | H01L 25/07 318/494 |
| 2013/0170268 A1* | 7/2013 | Yamada | H02P 27/08 363/131 |
| 2013/0343092 A1* | 12/2013 | Lin | H02M 7/4807 363/17 |
| 2014/0035497 A1* | 2/2014 | Vrankovic | H02P 27/06 318/400.25 |
| 2014/0241016 A1* | 8/2014 | Ho | H02M 7/493 363/40 |
| 2014/0338380 A1* | 11/2014 | Kamiya | F25B 1/10 62/129 |
| 2015/0256061 A1 | 9/2015 | Koji et al. | |

FOREIGN PATENT DOCUMENTS

| | | | |
|---|---|---|---|
| JP | 58-152629 | A | 9/1983 |
| JP | 5-15069 | A | 1/1993 |
| JP | 2006-25591 | A | 1/2006 |
| JP | 4391339 | B2 | 12/2009 |
| JP | 2010-172183 | A | 8/2010 |
| JP | 2010-213481 | A | 9/2010 |
| JP | 2011-10404 | A | 1/2011 |
| JP | 2012-19568 | A | 1/2012 |
| JP | 2012-39866 | A | 2/2012 |
| JP | 2012-43875 | A | 3/2012 |
| WO | WO 2010/073635 | A1 | 7/2010 |
| WO | WO 2010/131679 | A1 | 11/2010 |
| WO | WO 2011/086896 | A1 | 7/2011 |
| WO | WO 2013/002249 | A1 | 1/2013 |
| WO | WO 2013/008424 | A1 | 1/2013 |
| WO | WO 2014/061154 | A1 | 4/2014 |

OTHER PUBLICATIONS

Written Opinion (PCT/ISA/237) dated Oct. 21, 2014, by the Japanese Patent Office as the International Searching Authority for International Application No. PCT/JP2014/069201.
English Translation of Notification of Reason for Refusal of Japanese Patent Application No. 2016-534070 dated Oct. 25, 2016.
Office Action dated May 1, 2019, by the Indian Patent Office in corresponding Indian Patent Application No. 201747000158. (6 pages).
Office Action dated Jul. 5, 2017, by the State Intellectual Property Office (SIPO) of the People's Republic of China, in Chinese Patent Application No. 201480080658.6, and an English Translation of the Office Action. (11 pages).
Office Action (Notification of Reasons for Refusal) dated Dec. 19, 2017, by the Japanese Patent Office in corresponding Japanese Patent Application No. 2017-038431, and an English Translation of the Office Action. (4 pages).

* cited by examiner

SiC-MOSFET  SiC-FWD

Si-IGBT  Si-FWD

VEHICLE AUXILIARY POWER SUPPLY DEVICE

FIELD

The present invention relates, for example, to a vehicle auxiliary power supply device mounted in an electric rolling stock and that supplies desired power to a load.

BACKGROUND

As a conventional vehicle auxiliary power supply device, for example, in a vehicle auxiliary power supply device disclosed by Patent Literature 1, a pulse width modulation (PWM) converter is connected to an output terminal of a main transformer that transforms and outputs an AC input supplied from an AC overhead line; and in a configuration in which a three-phase inverter is connected to an output terminal of the PWM converter, a filter circuit that removes a harmonic component included in an output voltage of the three-phase inverter is disclosed.

CITATION LIST

Patent Literature

Patent Literature 1: Japanese Patent No. 4391339

SUMMARY

Technical Problem

Since many loads are mounted in an electric rolling stock, large current flows in the loads. Thus, even in a filter circuit, a size of a reactor included in the filter circuit is large. In view of reduction of weight, reduction of a cost, and the like, there is a demand for further downsizing of the reactor.

The present invention is made in view of the foregoing and is to provide a vehicle auxiliary power supply device that is configured in such a manner that further downsizing can be realized.

Solution to Problem

In order to solve the above-described problem and to achieve an object, the present invention relates to a vehicle auxiliary power supply device mounted in an electric rolling stock and the device includes a converter device to convert first DC power supplied from a DC power supply into second DC power, and a three-phase inverter to convert the DC power supplied from the converter device into three-phase AC power and to supply the converted power to a load, wherein a switching element of the three-phase inverter is constituted by a semiconductor module formed of a wide bandgap semiconductor.

Advantageous Effects of Invention

According to the present invention, an effect of being able to further downsize a vehicle auxiliary power supply device mounted in an electric rolling stock is achieved.

DESCRIPTION OF EMBODIMENTS

In the following, vehicle auxiliary power supply devices according to embodiments of the present invention will be described with reference to the attached drawings. Note that the present invention is not limited by the embodiments described below.

First Embodiment

Figure 1:
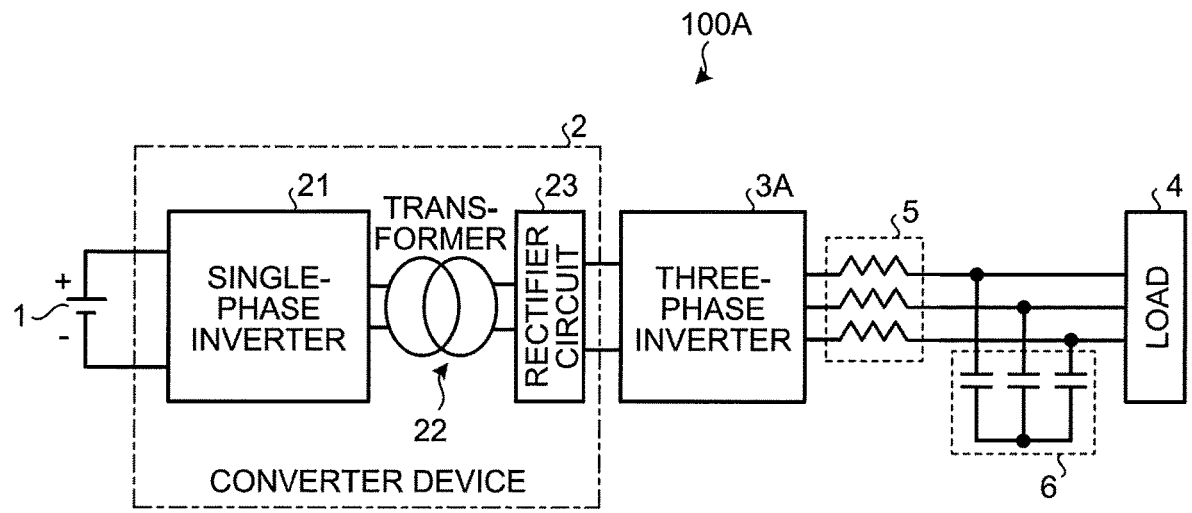
FIG. 1 is a diagram illustrating a configuration example including a vehicle auxiliary power supply device according to a first embodiment.

FIG. 1 is a diagram illustrating a configuration example including a vehicle auxiliary power supply device according to the first embodiment and illustrating an example of supplying desired power (AC power) to a load 4 by using DC power from a DC power supply 1. The DC power supply 1 means a source of supply of DC power. For example, the DC power supply corresponds to: a DC overhead line in an electric rolling stock; an AC-DC converter (converter) to convert power supplied from an AC overhead line, whose power is input through a main transformer, into DC power; a battery that can supply DC power in a case where the battery is mounted.

As illustrated in FIG. 1, a vehicle auxiliary power supply device 100A includes a converter device 2, a three-phase inverter 3A, a filter reactor 5, and a filter capacitor 6. The converter device 2 includes a single-phase inverter 21, a transformer 22, and a rectifier circuit 23. The filter reactor 5 is conned to an output side of a three-phase inverter 3A. One end side of the filter capacitor 6 is connected in a Y-shape and the other end side thereof is connected to the filter reactor 5. These filter reactor 5 and filter capacitor 6 operate as low-pass filter circuits to operate in such a manner that a harmonic included in the three-phase inverter 3A is decreased and that voltage applied to the load 4 further becomes a sinusoidal waveform.

The converter device 2 converts DC power (first DC power) supplied from the DC power supply 1 into stepped-down DC power (second DC power) and supplies the converted second DC power to the three-phase inverter 3A. The three-phase inverter 3A converts the DC power supplied from the converter device 2 into AC power and supplies the converted AC power to the load 4.

A voltage step-down function by the converter device 2 is realized by the single-phase inverter 21, the transformer 22, and the rectifier circuit 23. More specifically, DC power supplied from the DC power supply 1 is once converted into AC power by the single-phase inverter 21 and is input into the transformer 22, and is converted into stepped-down AC power by the transformer 22. As the AC power is converted into DC power by the rectifier circuit 23, the stepped-down DC power is supplied to the three-phase inverter 3A.

Figure 2:
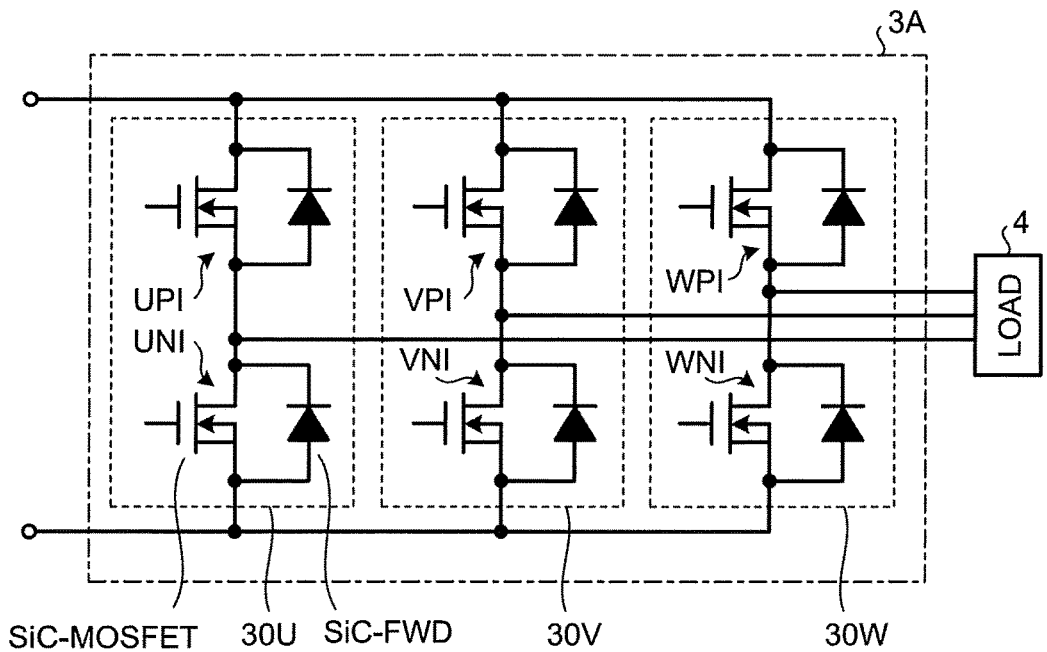
FIG. 2 is a diagram illustrating a circuit configuration of a three-phase inverter according to the first embodiment illustrated in FIG. 1.

FIG. 2 is a diagram illustrating a circuit configuration of the three-phase inverter 3A according to the first embodiment illustrated in FIG. 1. The three-phase inverter 3A is constituted by serial connection of: positive arms (such as UPI in U-phase) indicated by switching elements UPI, VPI, and WPI; and negative arms (such as UNI in U-phase) indicated by switching elements UNI, VNI, and WNI. That is, in the three-phase inverter 3A, a three-phase bridge circuit by three pairs of switching elements (for U-phase, V-phase, and W-phase) in each of which positive and negative arms are connected in series is constituted.

Each of the switching element (UPI, VPI, WPI, UNI, VNI, and WNI) is constituted by inverse parallel connection of a metal-oxide-semiconductor field-effect transistor (MOSFET) formed of silicon carbide (SiC) (SiC-MOSFET); and a free wheeling diode (FWD) that is also formed of SiC (SiC-FWD). Note that as the SiC-FWD, a Schottky barrier diode having a characteristic that a forward voltage is low and a recovery current hardly flows is preferably used.

Moreover, in the present embodiment, the three-phase inverter 3A is constituted by utilization of a 2-in-1 module in which two switching elements are connected in series and housed in one package. When 2-in-1 modules 30U, 30V, and 30W that are full SiC modules are used, the three-phase inverter 3A can be constituted by the three modules, whereby the number of modules can be decreased and the number of wiring lines between modules can be decreased. Thus, an advantageous effect of contributing to reduction of a size and a cost of a device is achieved.

Note that silicon carbide (SiC) is an example of a semiconductor called a wide bandgap semiconductor. Other than silicon carbide, a semiconductor formed, for example, by utilizing a gallium nitride-based material or diamond also belongs to a wide bandgap semiconductor. Thus, a configuration of using a different wide bandgap semiconductor other than silicon carbide is also included in the spirit of the present invention.

Figure 3:
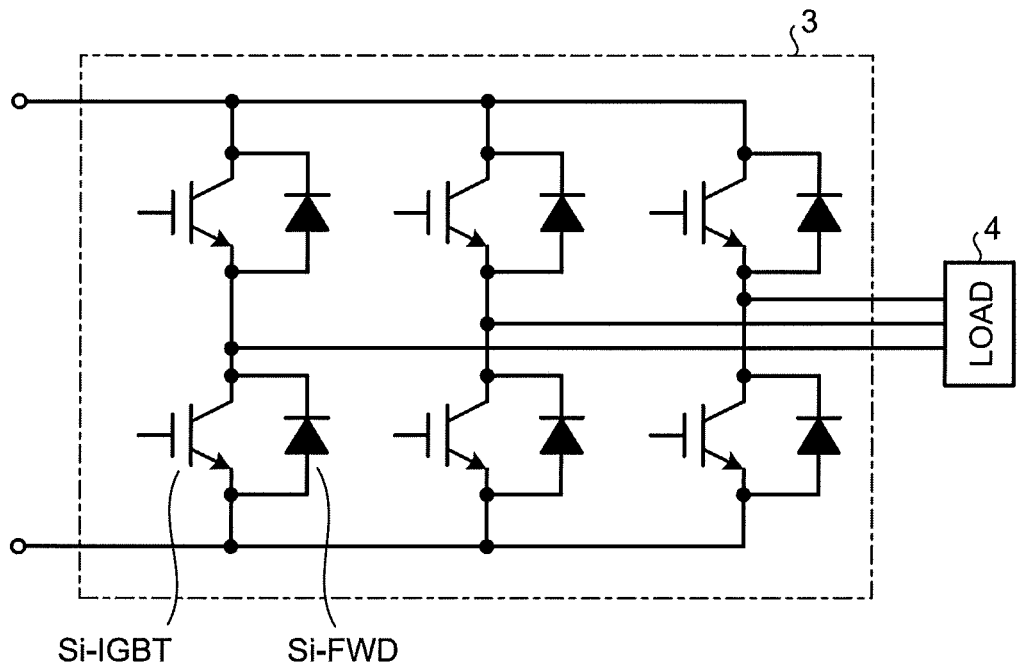
FIG. 3 is a diagram illustrating a circuit configuration of a three-phase inverter as a comparison example.

FIG. 3 is a diagram illustrating a circuit configuration of a three-phase inverter 3 as a comparison example. As illustrated in FIG. 3, the three-phase inverter 3 is generally constituted by six modules (hereinafter, referred to as "Si module") in each of which an insulated gate bipolar transistor (IGBT) formed of a silicon (Si)-based material (Si-IGBT) and an FWD that is also formed of an Si-based material (Si-FWD) are inversely connected in parallel.

In a case of using the three-phase inverter 3 constituted by the Si modules, a filter reactor 5 connected to an output side of the three-phase inverter 3 and a filter capacitor 6 one end side thereof is connected in a Y-shape and the other end side thereof is connected to the filter reactor 5 become essential. These filter reactor 5 and filter capacitor 6 operate as low-pass filter circuits to operate in such a manner that a harmonic included in the three-phase inverter 3 is decreased and that voltage applied to a load 4 further becomes a sinusoidal waveform.

In a case where an Si element is used as a switching element, it is impossible to make a switching element frequency higher compared to a frequency when an SiC element is used. For example, in the Si-IGBT, it is impossible to make a switching frequency high due to a limit in loss. For example, a limit value is around 5 kHz.

On the other hand, in a case where an SiC element is used as a switching element, it is possible to set a switching frequency to be more than 10 times as high as that of an Si element. For example, when the SiC element is driven at a switching frequency of around 50 kHz, it becomes possible to reduce sizes of the filter reactor 5 and the filter capacitor 6 into around 1/10. When the three-phase inverter 3A according to the first embodiment is constituted by SiC modules, it becomes possible to downsize the filter reactor 5 and the filter capacitor 6 significantly.

Figure 7:
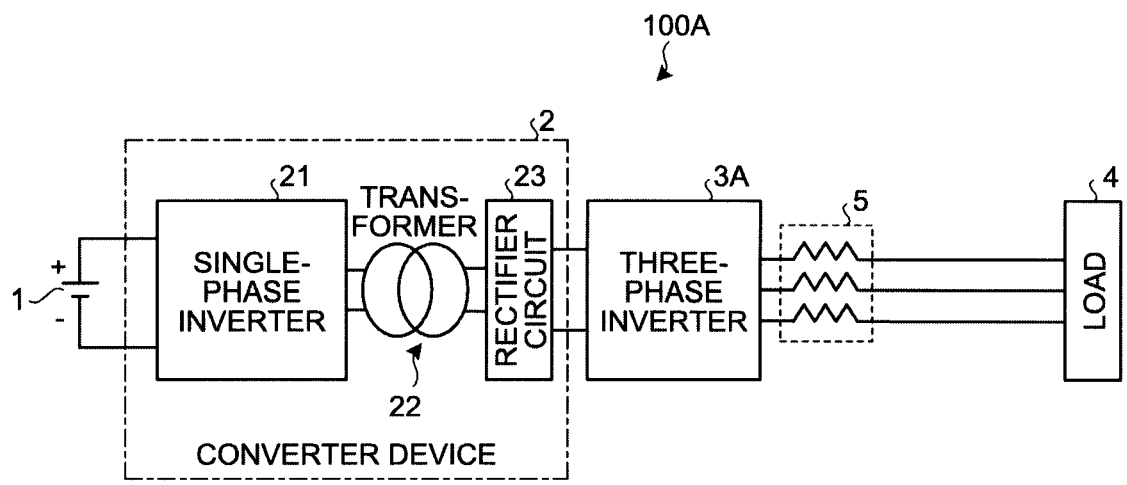
FIG. 7 is a diagram illustrating a configuration example including a vehicle auxiliary power supply device according to a third embodiment.
Figure 8:
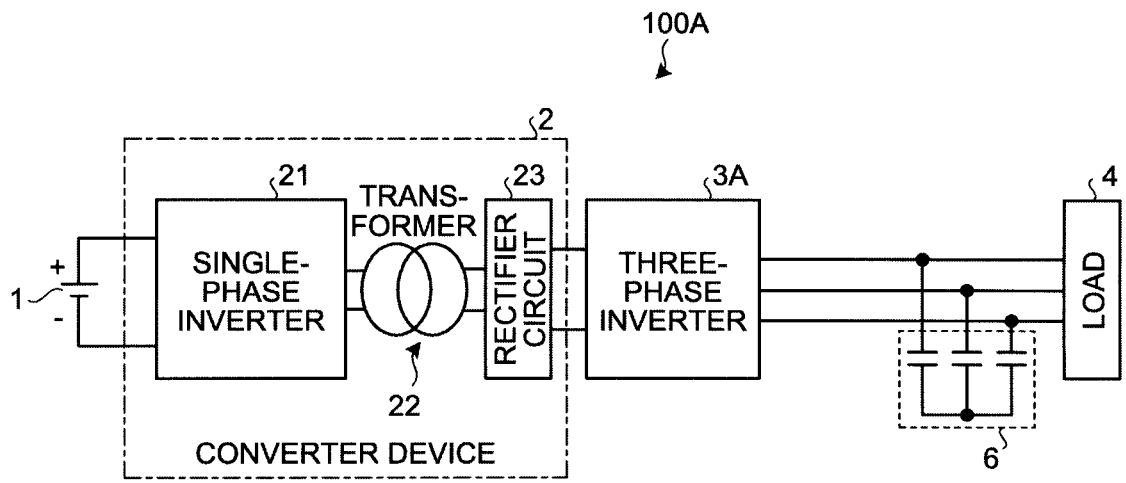
FIG. 8 is a diagram illustrating a configuration example including a vehicle auxiliary power supply device according to a fourth embodiment.

Moreover, in a case of driving the SiC element at a switching frequency exceeding 60 to 70 kHz, it is possible to omit one or both of the filter reactor 5 and the filter capacitor 6 depending on a stray inductance and stray capacitance of a main circuit wiring line or the load 4, whereby it is possible to reduce a size and weight of a whole device. FIG. 7 illustrates an embodiment in which the filter capacitor 6 is omitted and FIG. 8 illustrates an embodiment in which the filter reactor 5 is omitted.

On-resistance of the SiC element is lower and an allowable operating temperature of the SiC element is much higher than those of the Si element, thus the SiC element contributes to reduction of a size and a cost of a cooler.

As described above, in a vehicle auxiliary power supply device constituted by a semiconductor module with a switching element of a three-phase inverter being formed of a silicon-based material, there has been a problem that an output side of the three-phase inverter is large and heavy due to a filter reactor and a filter capacitor. On the other hand, according to the vehicle auxiliary power supply device of the first embodiment, a semiconductor module formed of a wide bandgap semiconductor is used as a switching element of a three-phase inverter instead of a semiconductor module formed of a silicon-based material. Thus, it is possible to form a configuration in such a manner that a filter circuit is omitted or downsized greatly and to acquire an effect of being able to further downsize a vehicle auxiliary power supply device mounted in an electric rolling stock.

Second Embodiment

Figure 4:
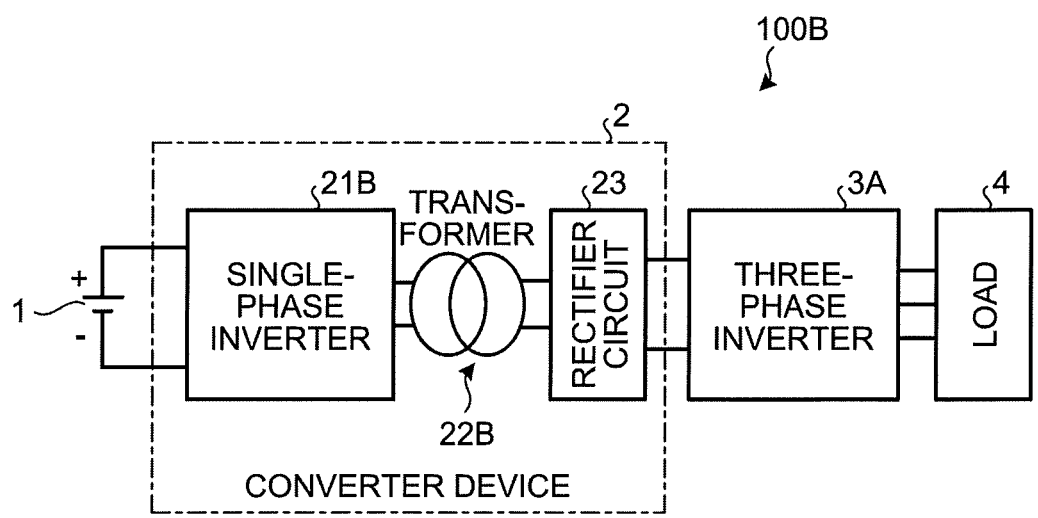
FIG. 4 is a diagram illustrating a configuration example of a vehicle auxiliary power supply device according to a second embodiment.
Figure 5:
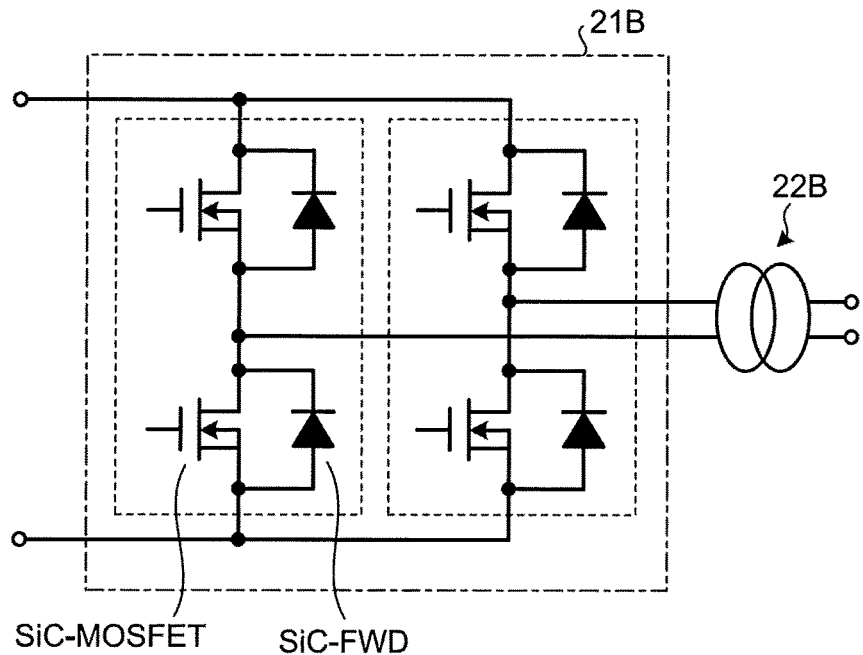
FIG. 5 is a diagram illustrating a circuit configuration of a single-phase inverter according to the second embodiment illustrated in FIG. 4.

FIG. 4 is a diagram illustrating a configuration example of a vehicle auxiliary power supply device according to the second embodiment and FIG. 5 is a diagram illustrating a circuit configuration of a single-phase inverter 21B according to the second embodiment illustrated in FIG. 4. In the vehicle auxiliary power supply device 100A according to the first embodiment, a case where the three-phase inverter 3A to drive the load 4 is constituted by a full SiC module has been described. However, in the second embodiment, as illustrated in FIG. 5, a single-phase inverter 21B included in a converter device 2 is constituted by a full SiC module in addition to the configuration of the first embodiment. Since the single-phase inverter 21B is constituted by the full SiC module, it becomes possible to use a further-downsized transformer 22B. Note that the other configurations are identical or equivalent to the configurations of the first embodiment illustrated in FIG. 1 and FIG. 2. Thus, identical signs are assigned to those configuration parts and overlapped description is omitted.

Figure 6:
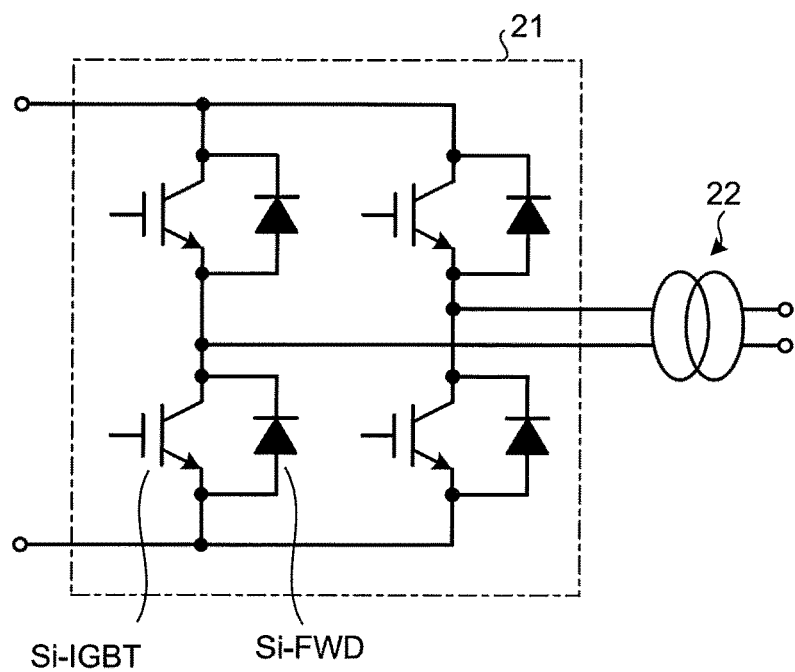
FIG. 6 is a diagram illustrating a circuit configuration of a single-phase inverter as a comparison example.

FIG. 6 is a diagram illustrating a circuit configuration of a single-phase inverter as a comparison example. Obviously, in the vehicle auxiliary power supply device according to the first embodiment, it is also possible to use a single-phase inverter 21 illustrated in FIG. 6. As illustrated in FIG. 6, the single-phase inverter 21 is constituted by four Si modules.

In the single-phase inverter 21 constituted by Si-IGBTs, it is difficult to make a switching frequency as high as the case of the three-phase inverter 3. On the other hand, a crosssectional area of an iron core in a transformer 22 and the number of turns of a coil wound around the iron core are inversely proportional to a frequency of an applied alternating voltage. Thus, when the transformer 22 arranged in the subsequent stage of the single-phase inverter 21 including the Si modules and the transformer 22B arranged in the subsequent stage of the single-phase inverter 21B including the SiC module are compared, a size of the transformer 22B inevitably becomes smaller. That is, according to the vehicle auxiliary power supply device of the second embodiment, an effect of being able to reduce a size of a transformer arranged in a following stage of a single-phase inverter is acquired.

In the second embodiment, an embodiment in which both of a semiconductor module included in a three-phase inverter and a semiconductor module included in a single-phase inverter are constituted by full SiC modules has been described. However, only the semiconductor module included in the single-phase inverter may be constituted by the full SiC module. With such a configuration, an effect of downsizing a transformer can be also acquired.

As described above, according to the vehicle auxiliary power supply device of the first embodiment, a semiconductor module formed of a wide bandgap semiconductor is used as a switching element of a single-phase inverter in a converter device instead of a semiconductor module formed of a silicon-based material, whereby an effect of being able to reduce a size of a transformer arranged in the subsequent stage of the single-phase inverter is acquired.

Note that configurations described in the above first and second embodiments are examples of a configuration of the present invention. It is obvious that combination with a different known-technology is possible and configuration with modification such as omission of a part is also possible within the spirit and the scope of the present invention.

For example, in each of the first and second embodiments, a rectifier circuit is arranged in the subsequent stage of a transformer. However, a bridge-connected single-phase converter having a voltage conversion function may be used. In this case, when a semiconductor module of the single-phase converter is constituted by a full SiC module, it is possible to downsize a cooler to cool the single-phase converter and to contribute to reduction of a size and a cost of a device.

INDUSTRIAL APPLICABILITY

As described above, the present invention is useful as a vehicle auxiliary power supply device configured in such a manner that further downsizing can be realized.

REFERENCE SIGNS LIST

1 DC power supply, 2 converter device, 3, 3A three-phase inverter, 4 load, 5 filter reactor, 6 filter capacitor, 21, 21B single-phase inverter, 22, 22B transformer, 23 rectifier circuit, 30U, 30V, 30W 2-in-1 module, 100A, 100B auxiliary power supply device for vehicle, UNI, VNI, WNI, UPI, VPI, WPI switching element.

The invention claimed is:

1. A vehicle auxiliary power supply device mounted in an electric rolling stock, the device comprising:
a converter to convert first DC power supplied to the electric rolling stock from a DC power supply into second DC power, which is stepped-down from the first DC power; and
a three-phase inverter to convert the second DC power supplied from the converter into three-phase AC output power having a sinusoidal waveform and to supply the converted three-phase AC output power to a load of the electric rolling stock,
wherein a semiconductor module formed of wide bandgap semiconductor is used as a switching element, having a switching frequency of at least 60 kHz, of the three-phase inverter, and
wherein only a filter reactor or only a filter capacitor is provided on an output side of the three-phase inverter.

2. The vehicle auxiliary power supply device according to claim 1, wherein the converter includes:
a single-phase inverter to convert the first DC power into AC output power, a transformer to convert the AC output power supplied from the single-phase inverter into stepped-down AC output power; and
a rectifier circuit to convert the power supplied from the transformer into the second DC power.

3. The vehicle auxiliary power supply device according to claim 1, wherein the wide bandgap semiconductor is a semiconductor using silicon carbide, a gallium nitride-based material, or diamond.

4. The vehicle auxiliary power supply device according to claim 1, wherein the device is used for a vehicle auxiliary power supply mounted in the electric rolling stock.

5. The vehicle auxiliary power supply device according to claim 1, wherein the three-phase inverter includes a three-phase bridge circuit having a plurality of semiconductor modules connected in switching element pairs in which positive and negative arms of the switching elements in each switching pair are connected in series, the three-phase inverter is configured to connect to a phase of a load at the series connection of the positive and negative arms of the switching elements in each switching element pair.

6. A vehicle auxiliary power supply device mounted in an electric rolling stock, the device comprising:
a converter to convert first DC power supplied from a DC power supply into second DC power which is stepped-down from the first DC power; and
a three-phase inverter to convert the second DC power supplied to the electric rolling stock from the converter into three-phase AC output power having a sinusoidal waveform and to supply the converted three-phase AC output power to a load of the electric rolling stock,
wherein a semiconductor module formed of wide bandgap semiconductor is used as a switching element, having a switching frequency of at least 60 kHz, of the three-phase inverter, and
wherein the three-phase inverter is connected to the load with no filter reactor and with no filter capacitor in-between.

7. The vehicle auxiliary power supply device according to claim 6, wherein the converter includes:
a single-phase inverter to convert the first DC power into AC output power, a transformer to convert the AC output power supplied from the single-phase inverter into stepped-down AC output power; and
a rectifier circuit to convert the power supplied from the transformer into the second DC power.

8. The vehicle auxiliary power supply device according to claim 6, wherein the wide bandgap semiconductor is a semiconductor using silicon carbide, a gallium nitride-based material, or diamond.

9. The vehicle auxiliary power supply device according to claim 6, wherein the device is used for a vehicle auxiliary power supply mounted in the electric rolling stock.

10. The vehicle auxiliary power supply device according to claim 6, wherein the three-phase inverter includes a three-phase bridge circuit having a plurality of semiconductor modules connected in switching element pairs in which positive and negative arms of the switching elements in each switching pair are connected in series, the three-phase inverter is configured to connect to a phase of a load at the series connection of the positive and negative arms of the switching elements in each switching element pair.

* * * * *